United States Patent
Kim

(10) Patent No.: US 10,286,802 B2
(45) Date of Patent: May 14, 2019

(54) ELECTRIC VEHICLE FOR CHARGING A BATTERY, A SYSTEM INCLUDING THE SAME, AND A METHOD FOR CHARGING A BATTERY OF AN ELECTRIC VEHICLE

(71) Applicants: HYUNDAI MOTOR COMPANY, Seoul (KR); KIA MOTORS CORPORATION, Seoul (KR)

(72) Inventor: Young Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 41 days.

(21) Appl. No.: 15/606,536

(22) Filed: May 26, 2017

(65) Prior Publication Data

US 2018/0170202 A1    Jun. 21, 2018

(30) Foreign Application Priority Data

Dec. 19, 2016 (KR) .......................... 10-2016-0173443

(51) Int. Cl.
*B60H 1/00* (2006.01)
*H04L 29/08* (2006.01)
*B60L 11/18* (2006.01)

(52) U.S. Cl.
CPC ...... *B60L 11/1838* (2013.01); *B60H 1/00392* (2013.01); *B60H 1/00735* (2013.01); *B60H 1/00778* (2013.01); *B60H 1/00964* (2013.01); *B60L 11/1816* (2013.01); *B60L 11/1861* (2013.01); *H04L 67/12* (2013.01); *B60L 2230/16* (2013.01); *B60L 2230/40* (2013.01); *B60L 2240/62* (2013.01); *B60L 2240/66* (2013.01); *B60L 2240/68* (2013.01); *B60L 2240/80* (2013.01); *B60L 2250/16* (2013.01); *B60L 2260/52* (2013.01); *B60L 2260/54* (2013.01); *B60L 2260/56* (2013.01); (Continued)

(58) Field of Classification Search
CPC .............. B60L 11/1816; B60L 11/1838; B60L 2230/16; B60L 2230/40; B60H 1/00392; B60H 1/00814; H04L 67/12
USPC .......................................................... 701/2
See application file for complete search history.

(56) References Cited

U.S. PATENT DOCUMENTS 8,347,642 B2 *  1/2013  Akahoshi ............... B60H 1/004
                                                         62/133
8,912,687 B2 * 12/2014  Kesler ................... B60L 11/182
                                                         307/104

(Continued)

FOREIGN PATENT DOCUMENTS

JP    2010-142026 A    6/2010
JP    2012-044813 A    3/2012
JP    2016-005926 A    1/2016

*Primary Examiner* — Atul Trivedi
(74) *Attorney, Agent, or Firm* — Brinks Gilson & Lione

(57) ABSTRACT

An electric vehicle, a system, and a method for charging a battery of the electric vehicle are disclosed. The system and electric vehicle sufficiently charge a battery even under an unexpected situation, and when a reserved charging time of the electric vehicle is fixed. The system and the electric vehicle economically use electricity by changing a time needed for battery charging, and drive an air conditioner of the vehicle in preparation for a weather situation such as intense cold or intense heat, thereby increasing user convenience and safety of a vehicle driver who rides in the vehicle.

17 Claims, 9 Drawing Sheets

(52) U.S. Cl.
CPC ........ *B60L 2260/58* (2013.01); *Y02T 10/7005* (2013.01); *Y02T 90/14* (2013.01); *Y02T 90/16* (2013.01); *Y02T 90/161* (2013.01); *Y02T 90/163* (2013.01)

(56) References Cited

U.S. PATENT DOCUMENTS

| | | | | |
|---|---|---|---|---|
| 8,916,279 | B2* | 12/2014 | Murase | B60L 3/0038 29/593 |
| 8,946,938 | B2* | 2/2015 | Kesler | B60L 11/182 307/104 |
| 8,957,549 | B2* | 2/2015 | Kesler | H03H 7/40 307/104 |
| 8,965,669 | B2 | 2/2015 | Fisher et al. | |
| 9,035,611 | B2* | 5/2015 | Kikuchi | B60L 3/0046 320/116 |
| 9,371,024 | B2* | 6/2016 | Ichishi | B60N 2/5628 |
| 9,515,359 | B2* | 12/2016 | Taniyama | B60L 1/003 |
| 10,052,939 | B2* | 8/2018 | Hamamoto | B60H 1/00921 |
| 10,059,172 | B2* | 8/2018 | Liu | F25B 49/022 |
| 2011/0095618 | A1* | 4/2011 | Schatz | H03H 7/40 307/104 |
| 2011/0101915 | A1* | 5/2011 | Mitsutani | B60K 6/445 320/109 |
| 2011/0246252 | A1* | 10/2011 | Uesugi | B60L 3/12 705/7.12 |
| 2013/0306302 | A1* | 11/2013 | Osaka | B60H 1/00385 165/287 |
| 2013/0339072 | A1* | 12/2013 | Touge | G06Q 10/00 705/5 |
| 2013/0342015 | A1 | 12/2013 | Takano et al. | |
| 2014/0027090 | A1* | 1/2014 | Morikawa | B60H 1/00828 165/47 |
| 2014/0060796 | A1* | 3/2014 | Ichishi | B60H 1/00864 165/204 |
| 2014/0088823 | A1* | 3/2014 | Kubo | B60L 11/1855 701/34.4 |
| 2014/0203775 | A1* | 7/2014 | Kim | B60L 11/1844 320/109 |
| 2014/0278089 | A1* | 9/2014 | Gusikhin | G01C 21/00 701/533 |
| 2014/0347017 | A1* | 11/2014 | Sugano | B60L 1/003 320/137 |
| 2015/0270719 | A1* | 9/2015 | Kurs | H02J 5/005 320/108 |
| 2015/0273976 | A1* | 10/2015 | Enomoto | B60K 6/22 165/202 |
| 2016/0121735 | A1* | 5/2016 | Sugano | B60L 11/1818 320/109 |
| 2016/0193896 | A1* | 7/2016 | Miyakoshi | B60H 1/00385 62/155 |
| 2017/0001494 | A1* | 1/2017 | Liu | F25B 49/022 |
| 2018/0126820 | A1* | 5/2018 | Makimoto | B60H 1/00028 |

* cited by examiner

ELECTRIC VEHICLE FOR CHARGING A BATTERY, A SYSTEM INCLUDING THE SAME, AND A METHOD FOR CHARGING A BATTERY OF AN ELECTRIC VEHICLE

CROSS-REFERENCE TO RELATED APPLICATION

This application claims priority to and the benefit of Korean Patent Application No. 10-2016-0173443, filed on Dec. 19, 2016, which is incorporated by reference in its entirety.

FIELD

The present disclosure relate to an electric vehicle, and more particularly to a method for charging a battery of a Plug-in Electric Vehicle (PEV) or a Plug-in Hybrid Electric Vehicle (PHEV).

BACKGROUND

The statements in this section merely provide background information related to the present disclosure and may not constitute prior art.

A vehicle may be classified into an internal combustion vehicle, a hybrid electric vehicle, and a pure electric vehicle according to power sources for generating driving force. The internal combustion vehicle generates power by burning fossil fuels, and has been widely used throughout the world. In order to address the depletion of fossil fuels used as fuels of the internal combustion vehicle and the environmental pollution, hybrid electric vehicles and pure electric vehicles have been developed and rapidly come into widespread use.

The hybrid electric vehicle may be classified into two kinds of hybrid electric vehicles, i.e., a first hybrid electric vehicle and a second hybrid electric vehicle. The first hybrid electric vehicle includes a motor and an internal combustion engine, and charges a battery using either driving power of the internal combustion engine or regenerative energy generated by braking of the vehicle, such that the motor is driven. That is, the first hybrid electric vehicle charges the battery with power generated therein without receiving power from an external part. Although the second hybrid electric vehicle includes a motor and an internal combustion engine in the same manner as in the first hybrid electric vehicle, the second hybrid electric vehicle can charge the battery upon receiving power from the external part in a different way from the first hybrid electric vehicle. That is, the second hybrid electric vehicle can charge the battery upon receiving power from the external part according to the plug-in scheme. The second hybrid electric vehicle is generally referred to as a plug-in hybrid electric vehicle (PHEV).

Various kinds of pure electric vehicles have been developed and rapidly come into widespread use. A hydrogen electric vehicle charges a battery with electricity generated by chemical reaction between hydrogen and oxygen so as to drive the motor. The hydrogen electric vehicle produces electricity and drives the motor using hydrogen as fuels, such that the hydrogen electric vehicle need not charge the battery upon receiving power from the external part. Another type of the pure electric vehicle includes only the battery and the motor without using fuels such as hydrogen, charges the battery upon receiving power from the external part, and drives the motor. This pure electric vehicle is generally referred to as a plug-in electric vehicle (PEV).

Each of the PEV and the PHEV includes a battery to provide a motor with power, and connects a plug installed at home or a charging station to a charging terminal of the PEV or PHEV according to the plug-in scheme, thereby charging the battery. If the battery for driving the motor of the PEV or PHEV is not sufficiently charged, it is difficult to drive the PEV or PHEV, such that it is very important to sufficiently charge the battery in advance prior to driving of the PEV or PHEV. In the present disclosure, the plug-in electric vehicle (PEV) and the Plug-in Hybrid Electric Vehicle (PHEV) will hereinafter be referred to as an electric vehicle.

SUMMARY

The present disclosure addresses an electric vehicle's insufficient battery charging problem under an unexpected situation because a reserved charging time of the electric vehicle is fixed. In forms of the present disclosure, an electric vehicle efficiently use electricity by changing a time needed for battery charging, and can drive an air conditioner of the vehicle in preparation for a weather situation such as intense cold or intense heat, thereby increasing user convenience and safety of a vehicle driver who rides in the vehicle.

Additional aspects of the present disclosure will be set forth in part in the description which follows and, in part, will be obvious from the description, or may be learned by practice of the present disclosure.

In one form of the present disclosure, an electric vehicle includes a battery configured to receive power from a charger; a communication part configured to receive information from an external part; and a controller configured to change a charging start time of the battery on the basis of event information received from the communication part, and charge the battery on the basis of the charging start time.

The controller may calculate the charging start time on the basis of a navigation schedule of the electric vehicle and a residual lifetime of the battery.

The controller may determine a scheduled departure time of the electric vehicle on the basis of the navigation schedule, and request acknowledgement of the scheduled departure time by controlling the communication part.

The controller may determine whether the scheduled departure time needs to be changed on the basis of the event information, and change the charging start time on the basis of the changed scheduled departure time.

The controller may request a user to acknowledge the charging start time by controlling the communication part.

The electric vehicle further includes a temperature sensor configured to measure a temperature; and an air conditioner configured to be operated upon receiving power from the battery.

The controller may determine whether the air conditioner needs to operate in advance on the basis of at least one of the event information and a detection value of the temperature sensor, and calculate a power amount of the battery used in the air conditioner.

The controller may change the charging start time on the basis of the power amount, and request a user to acknowledge the changed charging start time by controlling the communication part.

In another aspect of the present disclosure, a system may include: a user terminal configured to receive a navigation schedule from a user; a server configured to receive the navigation schedule received from the user terminal and event information received from an external part; and an electric vehicle configured to charge a battery using a charger. In particular, the server may change a charging start time of the battery on the basis of event information, and control the electric vehicle to perform battery charging on the basis of the charging start time.

The server may calculate the charging start time on the basis of the navigation schedule and a residual lifetime of the battery.

The server may determine a scheduled departure time of the electric vehicle on the basis of the navigation schedule, and request the user to acknowledge the scheduled departure time.

The server may determine whether the scheduled departure time needs to be changed on the basis of the event information, and change the charging start time on the basis of the changed scheduled departure time.

The electric vehicle may further includes an air conditioner configured to be operated upon receiving power from the battery; and the server may determine whether the air conditioner needs to operate in advance on the basis of the event information, calculate the amount of additional power used in the air conditioner, and change the charging start time on the basis of the power amount.

The server may transmit the changed charging start time to the user terminal, and requests the user to acknowledge the changed charging start time.

In another aspect of the present disclosure, a charging method for an electric vehicle may include: receiving, by a server, event information from an external part; changing, by the server, a charging start time of a battery on the basis of the event information; and charging, by a charger, the battery on the basis of the charging start time.

The charging method for an electric vehicle may further include calculating, by the server, the charging start time on the basis of a navigation schedule of the electric vehicle and a remaining lifetime of the battery.

The changing the charging start time of the battery may include determining whether a scheduled departure time needs to be changed on the basis of the event information; and changing the charging start time on the basis of the changed scheduled departure time.

The receiving the event information may include receiving a detection value transferred from a temperature sensor of the electric vehicle.

The changing the charging start time of the battery may include calculating the amount of power needed to pre-operate an air conditioner of the electric vehicle on the basis of the detection value from the temperature sensor and the event information; and changing the charging start time on the basis of the calculated power amount.

The charging method for an electric vehicle may further include transmitting the changed charging start time to a user of the electric vehicle, and requesting the user to acknowledge the changed charging start time.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
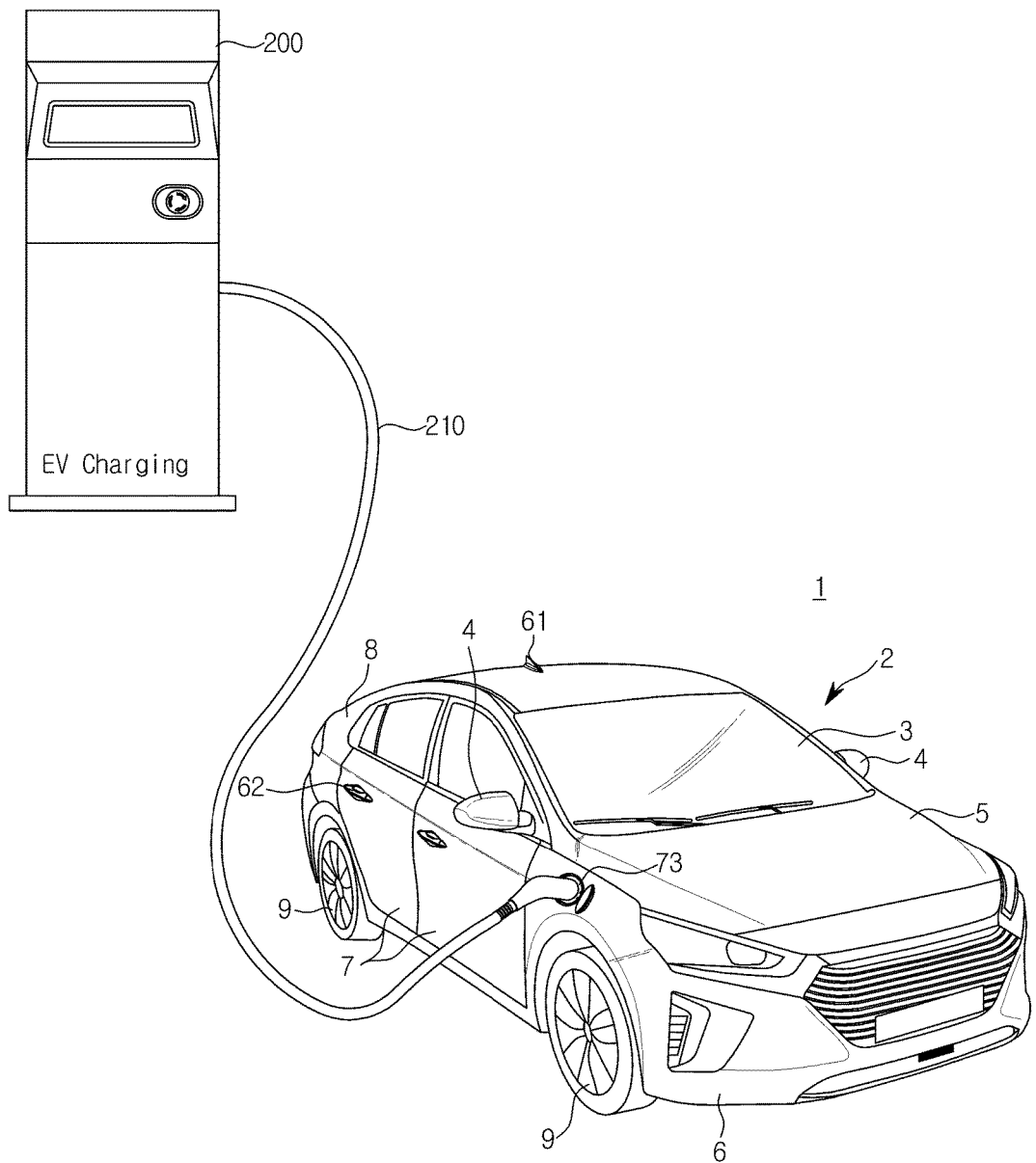
FIG. 1 is a view illustrating the appearance of an electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be noted that the specification of the present disclosure does not describe all the constituent elements of the forms, and general matters well known to those skilled in the art and redundant matters of the forms will not be described herein for clarity.

Throughout the specification of the present disclosure, terms " . . . part", " . . . module", " . . . member", " . . . block", and the like mean an element capable of being implemented by hardware, software, or a combination thereof. As used in the specification and appended claims, the term " . . . parts", " . . . modules", " . . . members", or " . . . blocks" may be implemented by a single constituent element, or the term " . . . part", " . . . module", " . . . member", or " . . . block" may include a plurality of constituent elements.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present disclosure, if it is assumed that a certain part includes a certain component, the term "comprising or including" means that a corresponding component may further include other components unless context clearly indicates otherwise.

In description of the present disclosure, the terms "first" and "second" may be used to describe various components, but the components are not limited by the terms. These terms may be used to distinguish one component from another component. For example, a first component may be called a second component and a second component may be called a first component without departing from the scope of the present disclosure. The term "and/or" may include a combination of a plurality of items or any one of a plurality of items.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and the forms of the present disclosure will hereinafter be described with reference to the attached drawings. An electric vehicle, a system including the same, and a method for charging a battery of the electric vehicle according to forms of the present disclosure will hereinafter be described with reference to the attached drawings.

FIG. 1 is a view illustrating the appearance of an electric vehicle in one form of the present disclosure.

Referring to FIG. 1, the electric vehicle 1 includes a body 2 forming the appearance of the electric vehicle 1, a front window (also referred to as a windshield) 3 or side windows 4 mounted to the body 2, and vehicle wheels 9 to move the electric vehicle 1 from place to place.

The body 2 of the electric vehicle may include a hood 5, a front fender 6, a door 7, a trunk lid 8, etc.

The doors 7 may be rotatably mounted to the left and right sides of the body 2, so that a driver and passenger can easily ride in or leave the electric vehicle 1 through the doors 190. When the doors 7 are closed, the doors 7 can shield the indoor space of the electric vehicle 1 from the outside. The doors 7 can be locked or unlocked using a door lock device 62.

A method for locking/unlocking the door lock device 62 may be classified into a first method for allowing the user (vehicle driver) to approach the electric vehicle 1 so that the user can directly manipulate the button or lever of the door lock device 62; and a second method for allowing the user to remotely lock or unlock the door lock device 62 using a remote controller or the like at a remote site distant from the electric vehicle 1. Specifically, the door lock device 62 may include an antenna to receive signals from the remote controller.

The antenna 61 may be provided at the top surface of the body 2 as shown in FIG. 1. The antenna 61 may receive broadcast/communication signals, for example, telematics signal, DMB signal, digital TV signal, GPS signal, etc. from a telematics center (see 120 of FIG. 4). The antenna 61 may be a multi-functional reception (Rx) device configured to receive various kinds of broadcast/communication signals, or may be a single functional Rx device configured to receive any one of broadcast/communication signals.

In one form, the electric vehicle 1 may receive various kinds of event information from the external part through the antenna 62. The antenna 62 may transmit the received signal, and the electric vehicle 1 may change the charging time of the battery 71 on the basis of the received signal. A detailed description thereof will hereinafter be described with reference to other attached drawings.

In the meantime, the electric vehicle 1 may include various windshields, for example, a front window 3 mounted to the front portion of the body 2 so as to provide a forward view of the electric vehicle 1 to a vehicle driver who rides in the electric vehicle 1, and side windows 4 to provide a lateral and rear view of the vehicle 1 to the vehicle driver.

In order to transfer clear information of the external part to passengers who ride in the vehicle 2, the windshield may also be mounted along with a temperature sensor 50 (see FIG. 5) configured to measure outdoor air temperature. The temperature sensor 50 may be provided to remove moisture caused by a difference in temperature between indoor air and outdoor air of the vehicle 2, and may provide temperature information needed to control the air conditioner 90 (see FIG. 2).

The wheels 9 may be classified into front wheels and rear wheels. The wheels 9 may rotate upon receiving power from the electric motor 72 (see FIG. 5). The electric motor 72 of the electric vehicle 1 may convert electric energy generated from the battery 71 into kinetic energy needed to rotate the wheels 9. The power source of the electric vehicle 1 may be electric energy stored in the battery 71.

The drive unit 60 may provide rotational force to the front wheels 51 or the rear wheels 52 in a manner that the main body 1 moves forward or backward. The drive unit 60 may include an engine to generate rotational force by burning fossil fuels or a motor to generate rotational force upon receiving power from a condenser (not shown). The battery 71 may receive electric energy from the external part of the body 2 (i.e., charger 200), as shown in FIG. 1.

The charger 200 may be connected to a charging door 73 mounted to the front fender 6 of the body 2, such that the charger 200 can charge the battery 71.

Prior to driving of the electric vehicle 1, the electric vehicle 1 connects the battery 71 to the charger 200 so that the electric vehicle 1 can prepare for driving. A conventional electric vehicle 1 has established the charging time needed to fully charge the battery 71, and has performed a reserved charging at a fixed time zone (i.e., at night hours) causing low electric charges.

However, if the air conditioner 90 operates in advance or a departure time is put forward according to an unexpected situation such as weather or traffic condition, the battery 72 may be insufficiently charged during only the fixed reservation time. The electric vehicle 1 may collect events caused by unexpected situations, and may change the reservation time, such that the electric vehicle 1 can solve the problem caused by the fixed reservation time.

Figure 2:
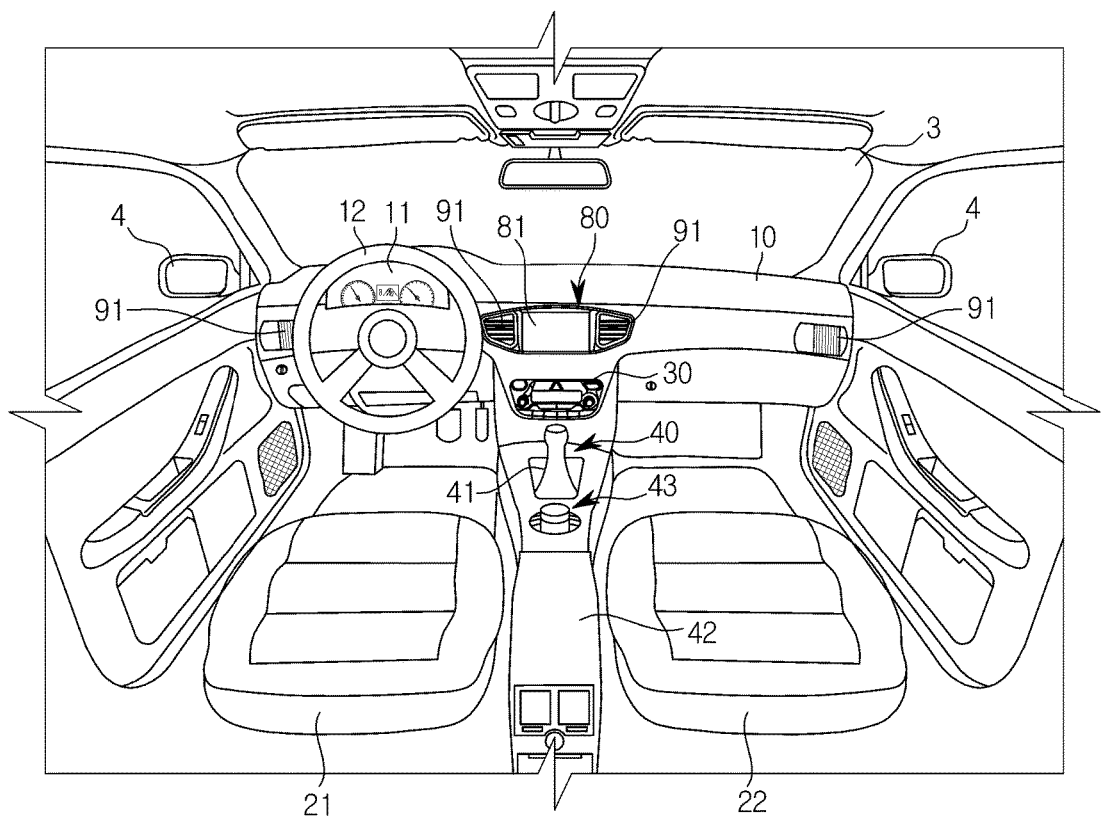
FIG. 2 is a view illustrating the internal structure of the electric vehicle.

FIG. 2 is a view illustrating the internal structure of the electric vehicle 1 in one form of the present disclosure.

Referring to FIG. 2, the indoor space of the electric vehicle 1 may include seats 21 and 22 on which passengers of the electric vehicle 1 sit; a steering wheel 12 mounted on the side of the driver seat 21 on which a driver sits; a cluster 11 mounted to a front portion of the body 2 from the steering wheel 12 and display operation information of the electric vehicle 1; and a dashboard 10 to which various devices connected to the cluster 11 to manipulate the electric vehicle 1 are mounted.

In more detail, the dashboard 10 may protrude from a lower portion of the windshield 3 toward the seats 21 and 22, such that the vehicle driver who looks forward can manipulate various devices mounted to the dashboard 10.

For example, various devices mounted to the dashboard 10 may include an Audio Video Navigation (AVN) device 80 mounted to a center fascia corresponding to the center region of the dashboard 10, an air outlet 91 of the air conditioner 90 mounted to a side surface of the display 81 of the AVN device 80, and various input devices 30 mounted to a lower portion of the AVN device 80.

The AVN device 80 may perform an audio function, a video function, and a navigation function according to manipulation of the passenger, and may be connected to a controller (i.e., a head unit) for controlling the electric vehicle 1.

The AVN device 80 may also perform two or more functions as desired. For example, the AVN device 80 may play music recorded in CD or USB by turning on the audio function, and at the same time may perform the navigation function. In addition, the AVN device 80 may display DMB images by turning on the video function, and at the same time may perform the navigation function.

The AVN device 80 may display a screen image related to the audio function, a screen image related to the video function, or a screen image related to the navigation function on the display 81. The display 81 may display a charging state of the electric vehicle 1. A detailed description thereof will hereinafter be described with reference to FIG. 3.

The display 81 may be implemented by any one of a Liquid Crystal Display (LCD) panel, a Light Emitting Diode (LED) panel, a Plasma Display Panel (PDP), an Organic Light Emitting Diode (OLED) panel, a Cathode Ray Tube (CRT), etc. without being limited thereto. The display 81 may be configured to include a touchscreen panel (TCP), and may operate as an input device.

The air outlet 91 of the air conditioner 90 (see FIG. 5) may be provided to both sides of the display 81 of the dashboard 10. The air conditioner 90 may automatically control the air-conditioning environment (including indoor/outdoor environmental condition of the electric vehicle 1, air intake/exhaust process, air circulation, cooling/heating condition, etc.), or may control the air-conditioning environment in response to a control command of the user.

For example, the air conditioner 90 may perform heating and cooling of the air, and may discharge the heated or cooled air through the air outlet 91, thereby controlling a temperature of the indoor space of the vehicle 1.

The air conditioner 90 may be controlled by a driver or a passenger to adjust the temperature of the internal space of the body 2, before the driver or passenger gets in the electric vehicle 1. In addition, the electric vehicle 1 may analyze electricity usage consumed to operate the air conditioner 90, and may adjust the charging time of the battery 71 on the basis of the analyzed electricity usage.

Meanwhile, the interior part of the electric vehicle 1 may include a center console 40 disposed between the seats 21 and 22, and a tray 42 connected to the center console 40. The center console 40 may include a gear lever 41 and a jog-wheel or various key-types of input buttons 43, without being limited thereto.

Figure 3:
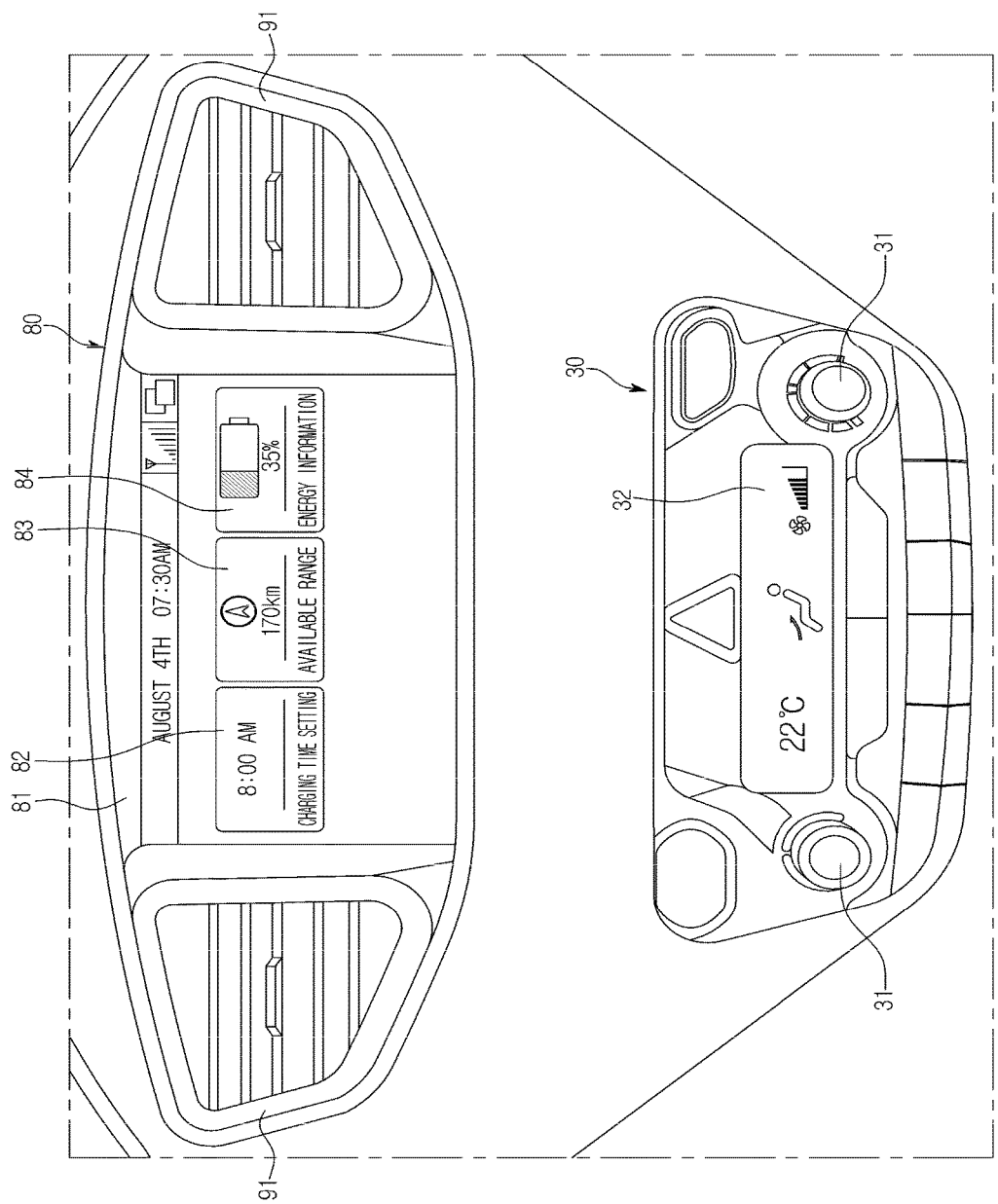
FIG. 3 is a view illustrating a method for setting battery charging of the electric vehicle.

FIG. 3 is a view illustrating a method for setting battery charging of the electric vehicle in one form of the present disclosure.

Referring to FIG. 3, the display 81 may display a charging time setting image 82 through which the vehicle driver can change a charging start time of the battery 71, and may also display not only an available driving range (i.e., the distance to empty) 83 indicating a current charging state of the battery 71, but also energy information 84.

As described above, the electric vehicle 1 may perform reservation charging for subsequent driving. For example, the vehicle driver may connect the electric vehicle 1 to the charging station 200 before leaving the electric vehicle 1, and may establish the reservation time (hereinafter referred to as the charging start time) through the display 81.

For example, the charging start time may be changed by a user who touches the region displayed on the display 81, or may be changed through the input button 43 mounted to the center console 40.

The AVN device 80 may provide the available range 82 and the battery charging state 83 as information needed to operate the battery 71 as shown in FIG. 3. The available range 82 may indicate a maximum range capable of being acquired from the current amount of battery charges, and the energy information 84 may represent State of Charge (SOC) of the battery 71 as a percentage (%). In this case, SOC may be conceptually identical to a fuel gauge of the vehicle including an internal combustion engine.

As can be seen from the display 81, the electric vehicle 1 may provide the available range 83 and the battery charging state 84 as information needed to operate the battery 71, such that the electric vehicle 1 may direct the vehicle driver to preset time information needed for the reservation charging.

Another display 32 provided at a lower end of the AVN device 80 may be an example for displaying a state of the air conditioner 90 and the like.

In more detail, the other display 32 may display a setting temperature (i.e., a target temperature), a ventilation mode, a ventilation fan speed, etc. of the air conditioner 90. The dial 31 mounted to a side surface of the display 32 may allow the vehicle driver to manually establish the ON/OFF operation and the air-conditioning temperature of the air conditioner 90.

As described above, the air conditioner 90 may start operation not only by a driver's input command, but also by a detection value received from the temperature sensor 50 (see FIG. 5) configured to measure a temperature, before the vehicle driver rides in the vehicle.

In this case, the air conditioner 90 may use power stored in the battery 71. The electric vehicle 1 may calculate the amount of power to be used by the air conditioner 90, and may change the charging start time. A detailed description thereof will hereinafter be described with reference to the attached drawings.

Figure 4:
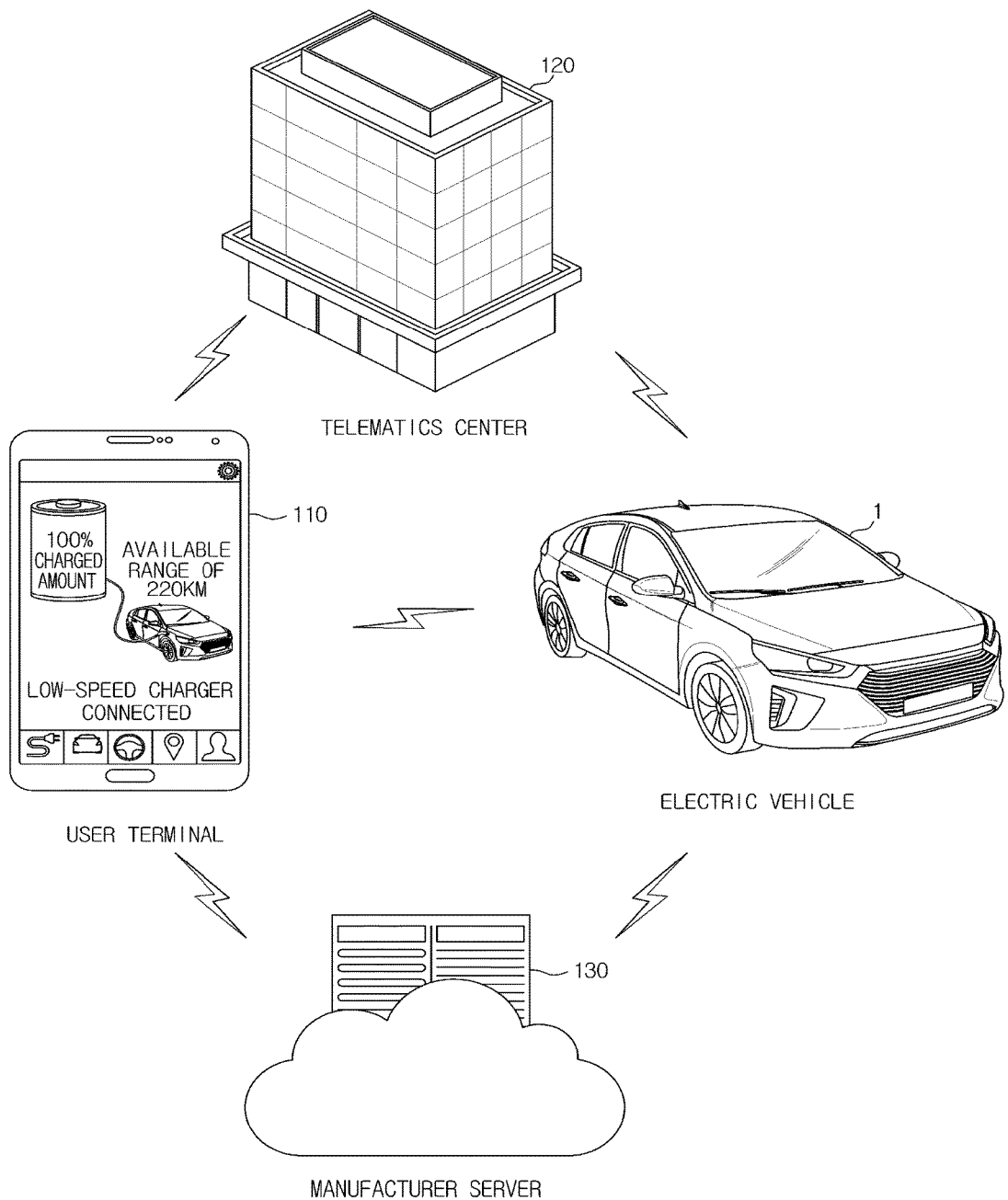
FIG. 4 is a view illustrating a system including the electric vehicle.

FIG. 4 is a view illustrating a system including the electric vehicle in one form of the present disclosure.

Referring to FIG. 4, the electric vehicle 1 may transmit an acknowledgement request for changing the charging start time to the vehicle driver through a user terminal (also called a user equipment UE) 110, and may receive information regarding event occurrence through the telematics center 120 or the manufacturer server 130 of the electric vehicle 1.

The user terminal 110 may allow the user to freely establish various functions of the electric vehicle 1 located at a remote site such that a user-desired function from among the functions of the electric vehicle 1 can be established. In addition, the electric vehicle 1 may also transmit the signal to the user terminal 110 so as to acknowledge the request for changing the charging start time of the battery 71.

In addition, the user terminal 110 may receive setting information including the change of the charging start time from the user, and may transmit the received setting information to the electric vehicle 1.

Meanwhile, the electric vehicle 1 for use in the system may directly communicate with the user terminal 110, and may wirelessly communicate with the user terminal 110 through the telematics center 120 or the manufacturer server 130.

The telematics center 120 or the manufacturer server 130 may collect event information needed for the electric vehicle 1 configured to change the battery charging time.

Event information may indicate information of the situation in which the time needed to fully charge the battery 71 needs to be changed. For example, the event information may include traffic conditions, worsening weather conditions, etc. capable of occurring on a route to the received destination.

The telematics center 120 or the manufacturer server 130 may determine whether the charging start time needs to be changed on the basis of the collected event information, and may transmit the changed charging start time to the electric vehicle 1. The electric vehicle 1 may perform battery charging on the basis of the signal received from the telematics center 120 or the manufacturer server 130.

Event information received by the telematics center 120 or the manufacturer server 130 of the system may receive setting information capable of being received from the user terminal 110, and a detailed description of the received setting information is as follows.

<Setting the Destination and the Charging Start Time>

The user may establish the destination of the electric vehicle 1 through an application (App) installed in the user terminal 110. The destination may indicate the destination setting needed to perform navigation of the navigation program. When the established destination is used for navigation, the AVN device 80 of the electric vehicle 1 may search for a route to the destination and may inform the user of the route when the user performs the electric vehicle 1.

As described above, the established destination may be referred for battery operation and management. That is, the system may calculate whether the current amount of battery charges is considered sufficient to move the electric vehicle 1 from the current position to the established destination. If the amount of battery charges is considered insufficient to move the electric vehicle 1 from the current position to the destination, the charging start time needed to fully charge the battery 71 is calculated.

Although the charging start time is established in advance, if there is a need to change the scheduled estimated departure time due to the event occurred in the route to the destination, the electric vehicle 1 may change the charging start time of the battery 71, and may transmit a signal for requesting acknowledgement of such change to the user terminal 110.

<Setting the Navigation Schedule and the Scheduled Departure Time>

For example, the user may establish a navigation schedule of the electric vehicle 1 through the application (App) installed in the user terminal 110. The navigation schedule may include a departure date and a scheduled departure time. The scheduled departure time may be a basis of the charging start time at which charging of the battery 71 is started such that the battery 71 can be fully charged.

In another example, the electric vehicle 1 may receive a navigation schedule established in a schedule guide service (i.e., a calendar service of the Internet portal site interacting with the user terminal 110 of the user or a calendar service installed in the manufacturer server 130), and may charge the battery 71 with electricity. In this case, the navigation schedule may include the departure date and the scheduled departure time.

The system based on the navigation schedule may determine the next destination of the electric vehicle 1. In addition, the system may search for a navigation route from the current position of the electric vehicle 1 to the destination, and may calculate the scheduled departure time according to the navigation route.

In the meantime, the telematics center 120, the manufacturer server 130 may transmit the navigation schedule and the calculated departure time to the user terminal 110, and may receive an accept message from the user. Alternatively, the navigation schedule and the calculated departure time may be established again by the user terminal 110.

<Event Information>

After the telematics center 120, the manufacturer server 130, and the electric vehicle 1 may calculate a time needed to charge the battery 71 on the basis of the destination setting or the navigation schedule, the electric vehicle 1 may receive event information indicating that the reservation time needs to be changed.

For example, the event information may include a delay time generated either when traffic congestion is detected on the route to the destination or when a bypass road is searched for due to the road blocked by worsening weather.

Besides, the event information may include information related to the air conditioner 90 to be described later.

<Air-Conditioning Setting>

The user may establish a target temperature of the air conditioner 90 needed for the subsequent vehicle driving through the application (App) embedded in the user terminal 110.

In more detail, the electric vehicle 1 may operate the air conditioner 90 prior to the scheduled departure time, and may control the indoor temperature of the vehicle 2 to reach a desired setting temperature when the driver rides in the electric vehicle 1. In the winter season, the electric vehicle 1 may establish a high target temperature (e.g., 29° C.) to increase the indoor temperature of the electric vehicle 1. In contrast, in the summer season, the electric vehicle 1 may establish a low target temperature (e.g., 22° C.) to reduce the indoor temperature of the electric vehicle 1.

If the electric vehicle 1 does not receive the setting temperature from the user terminal 110, the electric vehicle 1 may operate the air conditioner 90 on the basis of a preset logic so as to automatically adjust the target temperature. In addition, the electric vehicle may also establish the target temperature of the air conditioner 90 on the basis of data stored in the telematics center 120 or the manufacturer server 130.

Thereafter, the electric vehicle 1 may determine the necessity for pre-operating the air conditioner 90 upon receiving weather information from the telematics center 120 or the manufacturer server 130. For example, the telematics center 120 or the manufacturer server 130 may receive information indicating the possibility of sudden temperature drop at the scheduled departure time from the weather center or the like, and may transmit the received information to the electric vehicle 1. The electric vehicle 1 may transmit the signal indicating that the air conditioner 90 needs to be driven to the user terminal 110 on the basis of the received information.

In another example, the electric vehicle 1 may determine whether the air conditioner 90 needs to operate in advance on the basis of the detection value of the temperature sensor 50 mounted to the body 2. In this case, the electric vehicle 1 may determine the necessity of pre-operating the air conditioner 90.

If the electric vehicle 1 determines that the air conditioner 90 needs to operate in advance, or if the electric vehicle 1 receives a pre-operation command related to the operation of the air conditioner 90 from the user terminal 110, the electric vehicle 1 may calculate a time needed to operate the air conditioner 90 and power consumption (i.e., the amount of additional power) of the battery 71.

That is, event information may include information through which the charging start time of the battery 71 can be additionally changed on the condition that the air conditioner 90 needs to operate in advance.

Meanwhile, FIG. 4 illustrates the example in which the electric vehicle 1 receives event information and the charging start time of the battery 71 is changed on the basis of the received event information. That is, the electric vehicle 1 may receive various kinds of event information from other external devices (not shown), without being limited thereto.

Figure 5:
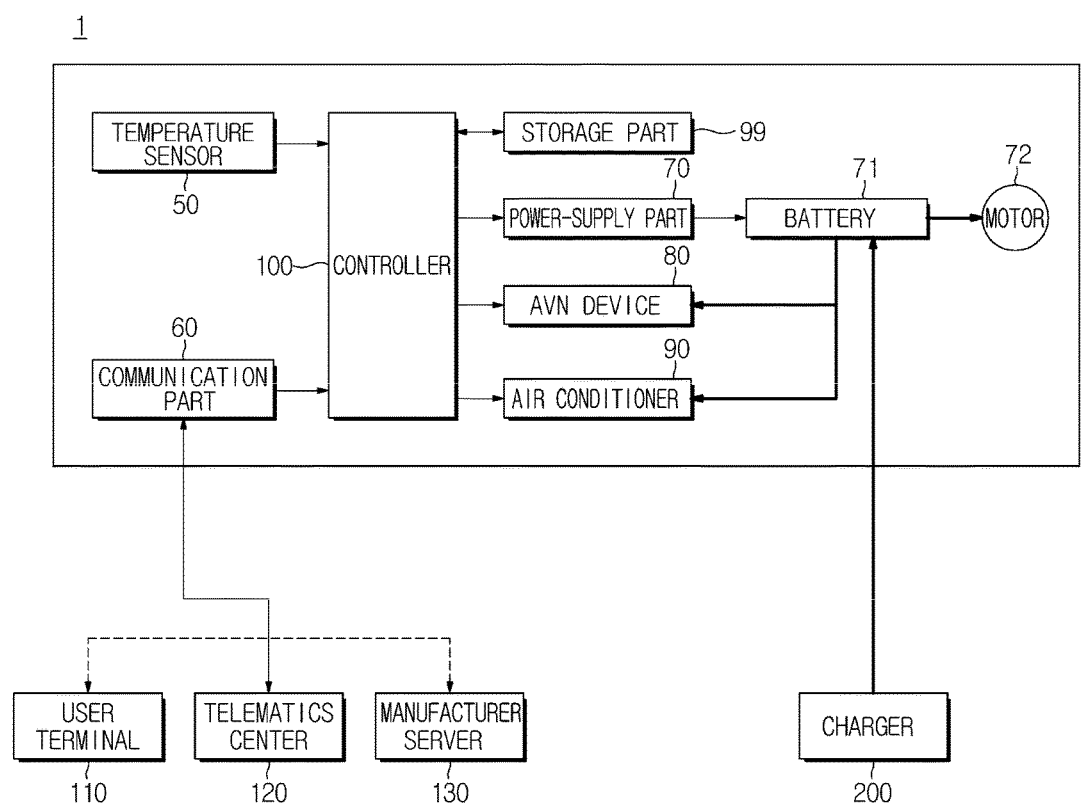
FIG. 5 is a block diagram illustrating the electric vehicle.

FIG. 5 is a block diagram illustrating the electric vehicle in one form of the present disclosure. Redundant details between the operation of FIG. 1 in which the electric vehicle 1 receives power through the charger 200 and the operation of FIG. 4 in which the electric vehicle 1 communicates with the external part will herein be omitted for convenience of description.

Referring to FIG. 5, the electric vehicle 1 may communicate with the user terminal 110, the telematics center 120, and the manufacturer server 130 over wired or wireless communication, and may charge the battery 71 using the charger 200.

The electric vehicle 1 may include a temperature sensor 50 to measure indoor temperature and outdoor temperature of the body 2; a communication part 60 to communicate with the external part of the electric vehicle 1; an electronic control unit (ECU) of the electric vehicle 1; a power-supply part 70 to control power-supply of the battery 71 and the electric motor 72; an AVN device 80; and an air conditioner 90; and a controller 100 to control the above-mentioned constituent elements.

As shown in FIG. 5, dotted lines among the communication part 60, the user terminal 110, the telematics center 120, and the manufacturer server 130 may denote flow of wireless communication with the electric vehicle 1. Solid lines among the battery 71, the motor 72, the AVN device 80, the air conditioner 90, and the charger 200 may denote flow of electric power.

The temperature sensor 50 may measure indoor temperature and outdoor temperature of the body 2, and may output the detected values to the controller 100. The controller 100 may transmit the received information to the vehicle driver through the communication part 60 on the basis of the received detection values.

For example, the controller 100 of the electric vehicle 1 needs to operate the air conditioner 90 in advance on the basis of the detection values of the temperature sensor 50. If the air conditioner 90 operates in advance, power of the battery 71 is consumed. A time needed to fully charge the battery 71 is elongated based on power consumption, such that the controller 100 may calculate the charging start time needed to fully charge the battery 71 on the basis of the amount of power consumption needed to operate the air conditioner 90.

Meanwhile, the temperature sensor 50 may include all the temperature sensing devices needed for the general vehicle 1, and the positions of the temperature sensing devices are not limited thereto.

As described above, the communication part 60 may denote a transceiver module for transmitting and receiving information to and from the external part of the electric vehicle 1. The communication part 60 may include an antenna 61 to receive radio frequency (RF) signals, and a modulation/demodulation module for modulating/demodulating such signals. The communication part 60 may convert the received signal into an electrical signal, and may transmit the electrical signal to the controller 100.

For example, the communication part 60 may perform short range communication, wired communication, and wireless communication.

In more detail, the short range communication may include a variety of short-range communication modules for transmitting/receiving signals over a wireless communication network over a short distance, for example, a Bluetooth module, an infrared communication module, a Radio Frequency Identification (RFID) communication module, a Wireless Local Access Network (WLAN) communication module, a Near Field Communication (NFC) communication module, a ZigBee communication module, etc.

The wired communication module may include various cable communication modules, for example, Universal Serial Bus (USB), High Definition Multimedia Interface (HDMI), Digital Visual Interface (DVI), RS-232 (recommended standard 232), power line communication, a Plain Old Telephone Service (POTS), etc. In addition, the wired communication module may include a Controller Area Network (CAN) communication module widely used in vehicle technology.

The storage part 99 may store the charging reservation time received from the vehicle driver, and may store various kinds of information processed by the controller 100.

Although the storage part 99 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto. The storage part 99 may be a memory that is implemented as a separate chip independent of the controller 100, or may be implemented as a processor and a single chip.

The power-supply part 70 may be an electronic control unit (ECU) to control power supply of the electric vehicle 1 according to a control signal of the controller 100. For example, the power-supply part 70 may also be a Battery Management System (BMS) processor configured to control and manage charging and discharging of the battery 71.

The electric vehicle 1 may supplement or substitute for the internal combustion engine configured to use fossil fuels, such that the electric vehicle 1 may use electric energy as power source. The electric energy stored in the battery 71 may be used to operate the electric motor 72, and the electric motor may convert electric energy into kinetic energy for rotating wheels 7.

That is, the power-supply part 70 may control the battery 71 and the electric motor 72 so as to manage electric energy of the electric vehicle 1. In addition, the power-supply part 70 may measure the amount of residual power of the battery 71, and may output the measured residual power to the controller 100. The controller 100 may calculate a time needed to fully charge the battery 71, and may transmit the calculated time to the controller 100. The controller 100 may calculate a time needed to fully charge the battery 71 on the basis of the received power.

The power-supply part 70 may control power of the electric vehicle 1, and may also provide a power-supply voltage to the internal electronic modules (e.g., the AVN device 80 and the air conditioner 90) of the electric vehicle 1. The respective electronic modules have different amounts of power, and the power-supply part 70 may also change a voltage by controlling a converter.

The motor 72 may be driven by polyphase alternating current (AC) power of the inverter so as to generate power (rotational force). As described above, the rotational force of the electric motor 72 may be used to rotate wheels 7 of the electric vehicle 1.

As described above, the AVN device 80 may perform the audio function, the video function, and the navigation function according to manipulation of the driver or user, and may operate upon receiving power from the battery 71. As shown in FIG. 3, the AVN device 80 may operate as a device configured to receive an input command such as a charging setting time needed to charge the battery 71.

The air conditioner 90 may be a device for cooling or heating the indoor space in which the passengers are located, of the electric vehicle 1. For cooling of the indoor space of the electric vehicle 1, the air conditioner may cool the air through a general cooling cycle including a compressor, a condenser, an evaporator, an expansion valve, etc., and may provide the cooled air to the indoor space of the electric vehicle 1. In the heating mode, the air conditioner 90 may heat the air using a separate heating coil, and may provide the heated air to the indoor space of the electric vehicle in which the passengers are located. The vehicle configured to use the internal combustion engine may heat the air of the indoor space using heat emitted from the internal combustion engine. However, the electric vehicle 1 configured not to use the internal combustion engine may use power of the battery 71 to perform the cooling and heating modes.

The air conditioner 90 in one form may operate in advance before the driver or user rides in the electric vehicle, thereby adjusting the indoor temperature of the body 2. In this case, information regarding the power amount of the battery 71 may be transferred to the controller 100. The controller 100 may calculate the charging start time requisite for the charging time on the basis of the power amount information.

The controller 100 may be a processor for overall control of the electric vehicle 1.

In more detail, the controller 100 may receive event information from the external part of the electric vehicle 1, and may determine whether the received event information is needed to change a time needed for full charging of the battery 71. This decision may be achieved by a logic preset in the controller 100, or may be achieved by an instruction command from the external part.

If the controller 100 needs to change the charging time, the controller 100 may change a scheduled charging start time needed to fully charge the battery 71 on the basis of the preset or received navigation schedule of the electric vehicle 1.

The controller 100 may transmit the changed charging start time to the vehicle driver through the communication part 60 so as to request acknowledgement from the vehicle driver. If acknowledgement from the vehicle driver is confirmed, the battery 71 can be charged on the basis of the changed charging start time. A detailed description of the operation of the controller 100 will hereinafter be described with reference to FIG. 6.

In the meantime, the electric vehicle 1 may further include not only the above-mentioned constituent elements of FIG. 5 but also various constituent elements. The scope or spirit of the constituent elements is not limited thereto, and other modifications may also be applied to the form. That is, the electric vehicle 1 may detect the occurrence of an event during the charging time of the battery 71, and may determine the necessity of changing the charging time on the basis of the detected event.

Figure 6:
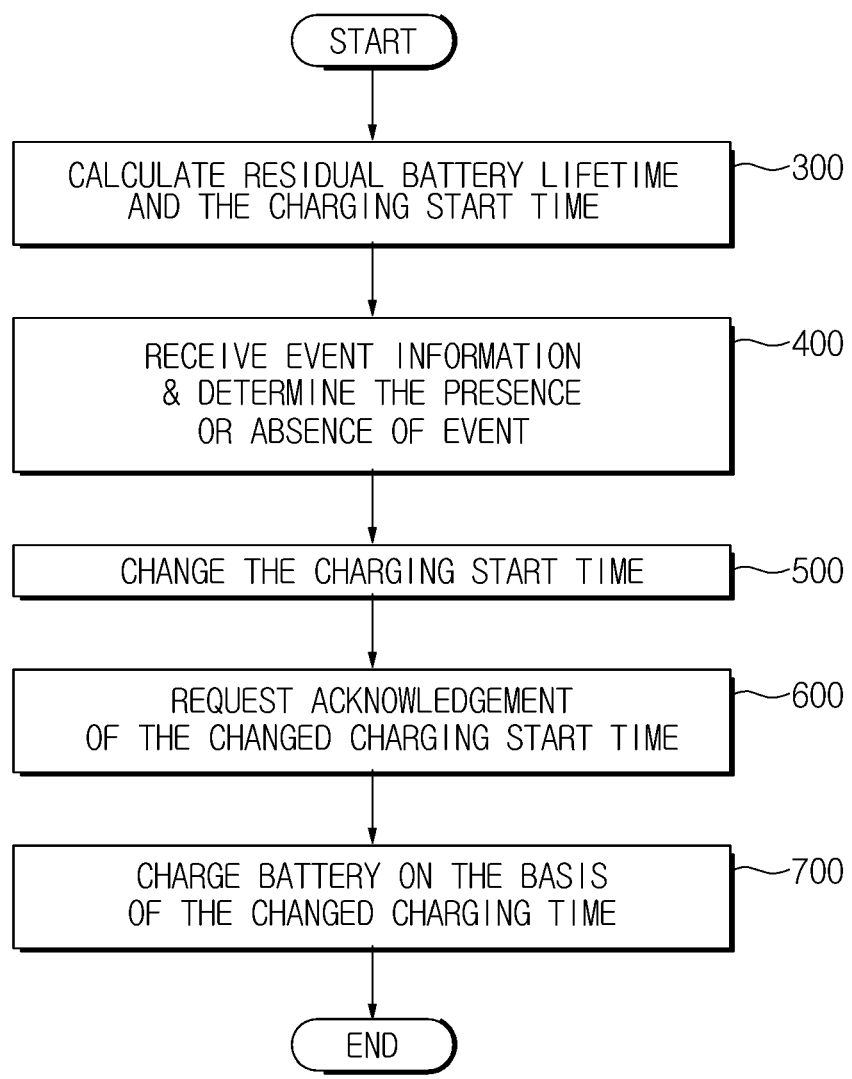
FIG. 6 is a flowchart illustrating a method for changing a battery charging time.

FIG. 6 is a flowchart illustrating a method for changing a battery charging time in one form of the present disclosure.

FIGS. 6 to 9 illustrate flowcharts of the operation for changing the charging start time of the electric vehicle 1. However, the scope or spirit of the present disclosure is not limited to the electric vehicle 1. The system including the telematics center 120 or the manufacturer server 130 may receive event information, and the received event information may also be applied to the operation for changing the charging start time of the electric vehicle.

Referring to FIG. 6, the electric vehicle 1 may confirm the residual power of the battery 71, and may calculate the time (i.e., the charging start time) needed for battery charging (Operation 300).

For example, the controller 100 of the electric vehicle 1 may receive the residual power of the battery 71 from the power-supply part 70. In addition, the controller 100 may determine a time needed to fully charge the battery 71 on the basis of the predetermined battery capacity or the residual battery lifetime.

Thereafter, the controller 100 may calculate the charging start time of the battery 71 on the basis of the determined time. The charging start time may be received through the AVN device 80 or the communication part 60, or may be decided on the basis of the navigation schedule (shown in FIG. 4) received from the telematics center 120 or the like.

For example, assuming that a navigation schedule for the next day is 06:00 (AM) and a consumption time needed to fully charge the battery is 6 hours, the controller 100 may calculate the charging start time of the battery 71 to be 02:00 (AM). The charging start time may be calculated in various ways, and a detailed description thereof will hereinafter be described with reference to FIG. 7.

In the meantime, the time needed for battery charging and the remaining power of the battery may be output through the AVN device 80, and the calculated charging start time may be transferred to the vehicle driver or the like through the communication part 60.

The controller 100 may operate in a standby mode until reaching the charging start time. During the standby mode, the controller 100 may receive event information from the external part (e.g., the user terminal 110, the telematics center 120, or the manufacturer server 130), and may determine whether the received event information is needed to change the charging start time (Operation 400).

Various events may be used to change the charging time.

As described above, the event information may include information regarding an unexpected situation in which the electric vehicle 1 must search for a detour in the route to the destination contained in the navigation schedule because of the change of traffic condition. In this case, if the scheduled departure time is changed because the scheduled arrival time is changed due to the detected detour, the controller 100 may decide to change the charging start time.

In another example, the event information may include weather change information indicating that a temperature suddenly drops at the scheduled departure time of the next day. The controller 100 may receive an event regarding the weather information, and may decide to pre-operate the air conditioner 90. The air conditioner 90 consumes power of the battery 71, such that the controller 100 may calculate the amount of power needed to operate the air conditioner 90, thereby changing the charging start time. A detailed description of the event information will hereinafter be described with reference to FIGS. 8 and 9.

The controller 100 may calculate the charging time needed to fully charge the battery 71 on the basis of the event, and may change the charging start time of the battery 71 (Operation 500).

The charging start time may be changed in various ways. For example, assuming that delay of 30 minutes is expected according to detour searching, the charging start time preset to 02:00 (AM) may be changed to 01:30 (AM). If the charging start time needs to be changed, the controller 100 may transmit the changed charging start time to the vehicle driver (Operation 600).

For example, the controller 100 may inform the user terminal 100 of a notification message indicating that the charging start time needs to be changed, through the communication part 60, and may request an acknowledgement message needed to change the charging start time from the user terminal 100.

If acknowledgement is completed, the controller 100 may charge the battery 71 on the basis of the changed charging start time (Operation 700).

In more detail, the controller 100 may control the power-supply part 70 to enter the standby mode, and may control the power-supply part 70 to operate at the changed charging start time. The power-supply part 70 transitioned from the standby mode may transmit signals to the charger 200 or the like, and may receive desired power in response to the charging start time.

FIG. 6 is a flowchart illustrating the operation of the electric vehicle 1 or the system configured to change the charging start time.

Figure 7:
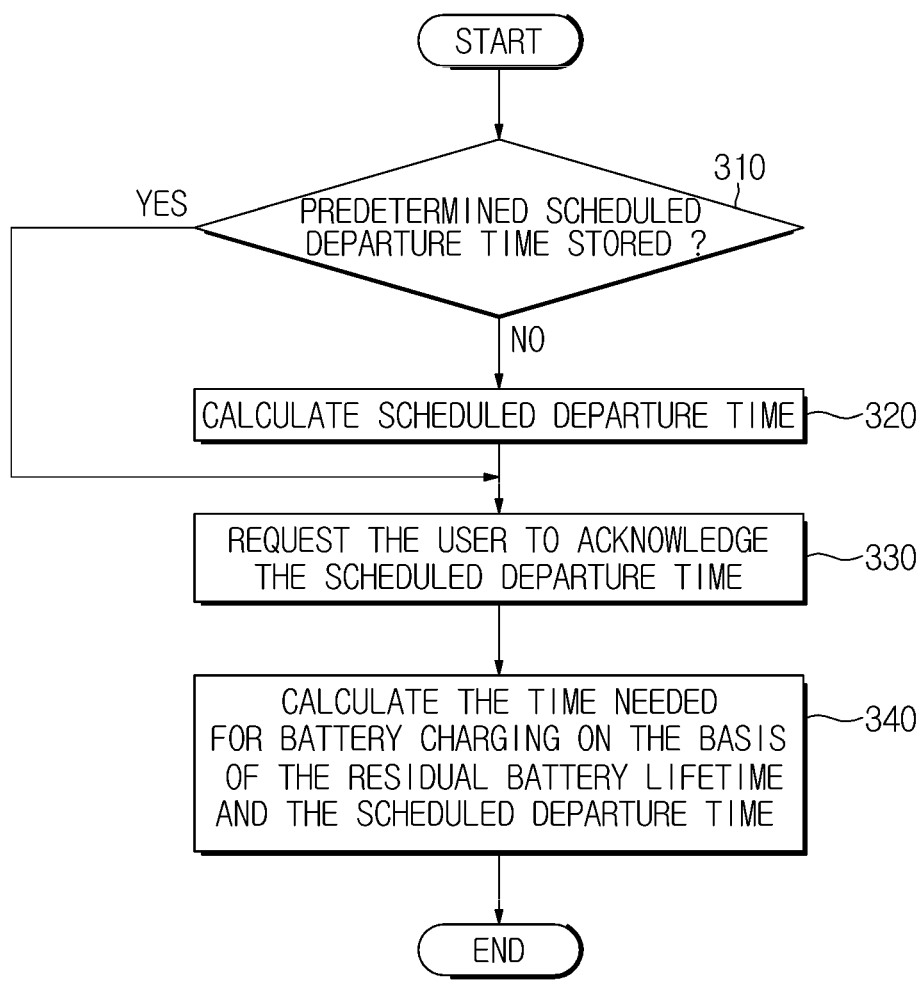
FIG. 7 is a flowchart illustrating a process (see 300 of FIG. 6) for calculating a charging start time.

FIG. 7 is a flowchart illustrating a process (see 300 of FIG. 6) for calculating the charging start time in one form of the present disclosure.

Referring to FIG. 7, the controller 100 may determine whether the scheduled departure time is stored in the storage part 99 (Operation 310).

For example, the vehicle driver may establish the charging start time of the next day of the electric vehicle 1 through the AVN device 80 or the user terminal 110. If the scheduled departure time is stored in the storage part 99, the controller 100 may request the driver or user to confirm the scheduled departure time (Operation 330).

If the scheduled departure time is not stored in the storage part 99, the controller 100 may receive information regarding the scheduled departure time from the vehicle driver or the external part (Operation 320).

For example, if the driver turns off the ignition button before leaving the electric vehicle 1, the controller 100 may visually or audibly output an image or sound needed for requesting the driver to input the scheduled departure time through the AVN device 70. As a result, the controller 100 may guide the driver or user to input the scheduled departure time.

In another example, the controller 100 may receive the navigation schedule from the external part through the communication part 60. In more detail, the controller 100 may receive the navigation schedule through the calendar service interacting with the user terminal 110 or through the service embedded in the manufacturer server 130, and may receive information regarding the scheduled departure time of the next day.

Thereafter, the controller 100 may request the driver or user to confirm the calculated scheduled departure time (Operation 330).

If the driver or user confirms the scheduled departure time, the controller 100 may calculate the charging start time needed to charge the battery on the basis of the remaining battery lifetime and the scheduled departure time (Operation 340).

In more detail, after the controller 100 confirms that the scheduled departure time of the next day is 08:00 (AM), the controller 100 may determine that 6 hours are needed to fully charge the battery 71. In this case, the controller 100 may calculate a specific time 02:00 (AM) as the charging start time.

Figure 8:
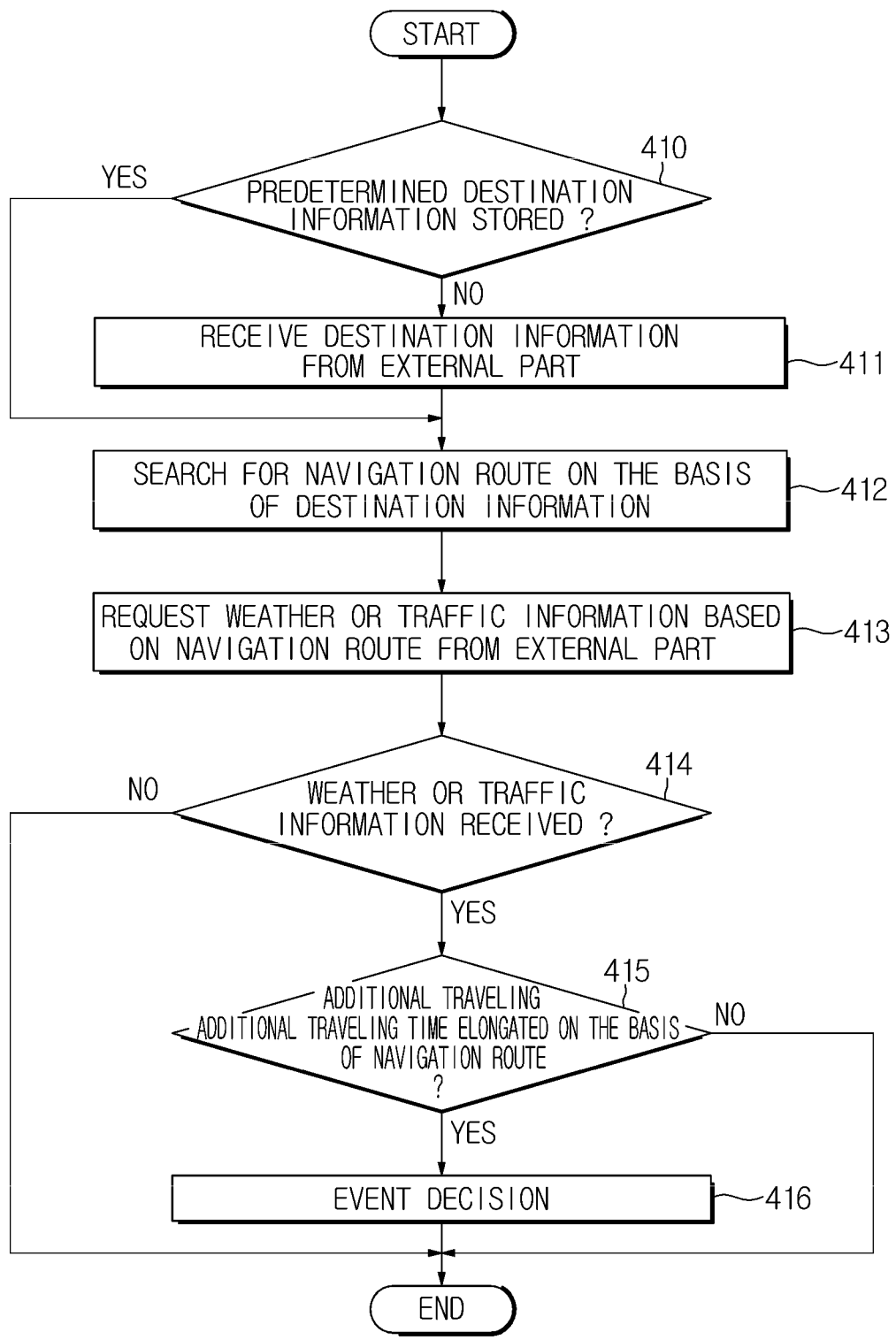
FIG. 8 is a flowchart illustrating a process (see 400 of FIG. 6) for determining an event.

FIG. 8 is a flowchart illustrating a process (see 400 of FIG. 6) for determining the event in one form of the present disclosure.

As described above, the event may denote a specific situation in which the scheduled departure time calculated in FIG. 7 needs to be changed.

Referring to FIG. 8, the controller 100 may determine whether or not the predetermined destination information is stored (Operation 410).

If destination information is stored, the controller 100 may search for the navigation route from the current position of the electric vehicle to the destination on the basis of the destination information. The current position may be received from a Global Positioning System (GPS) or the like through the communication part 60.

If destination information is not stored, the controller 100 may receive the destination information from the external part (Operation 411).

In more detail, the controller 100 may request destination information from the user terminal 110 through a notification message generated from the application (App) embedded in the user terminal 110, or may receive the next-day destination information through the navigation schedule received from the manufacturer server 130 or the like.

Upon receiving destination information from the external part, the controller 100 may search for a traveling route (i.e., a navigation route) to the destination (Operation 412).

Thereafter, the controller 100 may request again weather or traffic information based on the navigation route from the external part at step 413.

In this case, the weather information may be an unusual weather generated in the region extending to the navigation route. For example, if a heavy snowfall watch is issued in the region contained in the navigation route, a road may be blocked due to unusual weather. If the road is blocked, the controller 100 must search again the navigation route, such that the heavy snowfall watch may correspond to weather information.

Traffic information may denote a road control situation generated in the navigation route. In addition, the traffic information may also include information regarding a specific situation in which the controller 100 must search for a detour because of traffic congestion generated in the road contained in the navigation route.

Meanwhile, the controller 100 need not always request in real time weather information or traffic information from the external part, and transmits the discovered navigation route to the telematics center 120 or the manufacturer server 130. Thereafter, the controller 100 may control the electric vehicle to enter the standby mode. The telematics center 120 or the manufacturer server 130 may transmit various kinds of data needed to drive the electric vehicle 1. If the communication part 60 receives information, the controller 100 may enter the activation state by changing the standby mode, and may determine whether or not the received information is an event.

The controller 100 may receive weather or traffic information collected by the telematics center 120 or the manufacturer server 130 of the system through the communication part 60 (Operation 414).

Upon receiving the weather or traffic information, the controller 100 may determine whether the navigation route to the destination needs to be changed on the basis of the received information.

If the additional traveling time is not increased on the basis of the navigation route, the controller 100 may determine that the received information is not identical to the event.

At step 415, when the controller 100 again searches for the navigation route on the basis of the received information, if the controller 100 decides to again search for the detour, the controller 100 searches for the detour and calculates the increased time due to searching of the detour.

If the additional traveling time increases, the controller 100 may determine the received weather or traffic information as the event (Operation 416).

Figure 9:
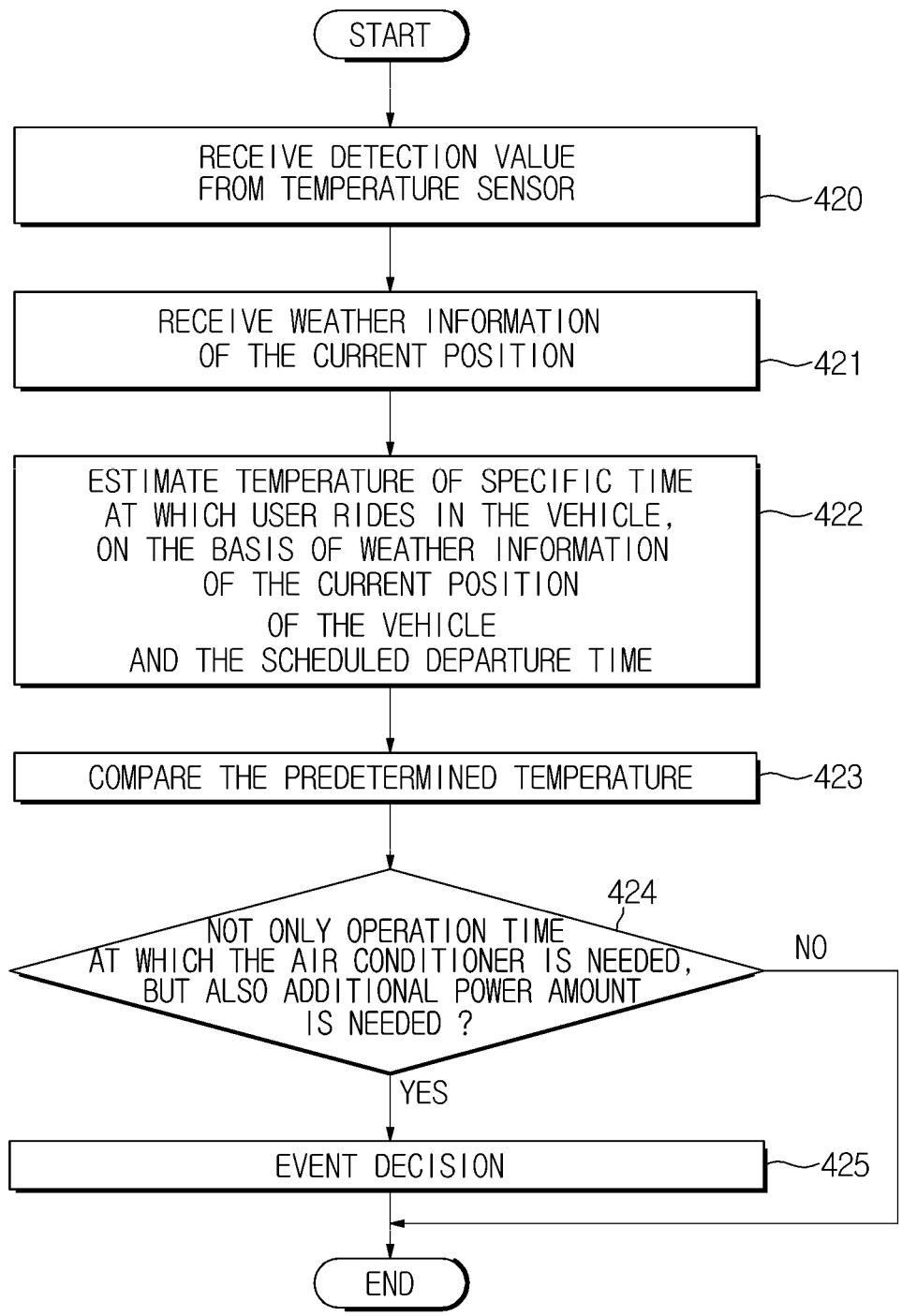
FIG. 9 is a flowchart illustrating a process (see 400 of FIG. 6) for determining an event.

FIG. 9 is a flowchart illustrating a process (see 400 of FIG. 6) for determining an event in one form of the present disclosure.

Referring to FIG. 9, the controller 100 may receive the indoor temperature and the outdoor temperature of the body 2 from the temperature sensor 50 (Operation 420).

The controller 100 may store the received detection value in the storage part 99.

The controller 100 may receive weather information of the current position of the electric vehicle 1 from the external part through the communication part 60 (Operation 421).

In this case, the received weather information may be the air temperature (predicted by the weather center or the like) of the scheduled departure time.

The controller 100 may collect weather information and the detection value of the temperature sensor on the basis of the scheduled departure time, thereby predicting the air temperature of the scheduled departure time at which the driver or user rides in the electric vehicle (Operation 422).

For example, the controller 100 may determine the scheduled departure time to be 08:00 (AM) on the basis of the navigation schedule or the like. Thereafter, the controller 100 may receive weather information indicating that sudden temperature drop is expected at 08:00 (AM) of the next day from the manufacturer server 130. Alternatively, the controller 100 may receive a detection value detected by the temperature sensor 50 such that the controller 100 may recognize that sudden temperature rise has occurred at the current position of the parked electric vehicle 1.

In this case, the controller 100 may compare the predetermined temperature with the predicted temperature (Operation 423).

For example, the predetermined temperature may be the body 2's indoor temperature in which the driver or user feels comfortable. The predetermined temperature may be changed in various ways according to the user setting, weather, and regions, without being limited thereto.

The controller 100 may compare the predicted temperature with the predetermined temperature such that the controller 100 can determine that the air conditioner 90 needs to operate (Operation 424).

In more detail, the controller 100 may compare the predicted temperature with the predetermined temperature, such that the controller 100 may determine that the indoor temperature of the electric vehicle 1 needs to be adjusted by driving the air conditioner 90 prior to 30 minutes on the basis of the scheduled departure time.

In this case, the controller 100 may determine the received detection value of the temperature sensor 50 or the received weather information to be an event (Operation 425).

As illustrated in FIGS. 8 and 9, the electric vehicle 1 may determine the presence or absence of the event indicating that the charging start time needs to be changed on the basis of various kinds of information. That is, the electric vehicle 1 may calculate the additional time or changed time needed to fully charge the battery 71 of the electric vehicle 1 on the basis of the event, such that the electric vehicle 1 can solve the problem encountered by the fixed reservation time for charging, can operate the air conditioner 90 or the like by predicting the departure time, such that the electric vehicle 1 can allow the driver or passengers to feel comfortable and safety.

As is apparent from the above description, an electric vehicle, a system including the same, and a method for controlling a battery of the electric vehicle in the forms of the present disclosure can address insufficient battery charging in which the battery is insufficiently charged according to an unexpected situation because a reserved charging time of the electric vehicle is fixed, can economically use electricity by changing a time needed for battery charging, and can drive an air conditioner of the vehicle in preparation for a weather situation such as intense cold or intense heat, thereby increasing user convenience and safety of a vehicle driver who rides in the vehicle.

Although a few forms of the present disclosure have been shown and described, it would be appreciated by those skilled in the art that changes may be made in these forms without departing from the principles and spirit of the present disclosure.

What is claimed is:

1. An electric vehicle comprising:
   a battery configured to receive power from a charger;
   a communication part configured to receive information from an external part; and
   a controller configured to;
      calculate a charging start time based on a navigation schedule for a departure of the electric vehicle and a residual lifetime of the battery when the battery is connected to the charger,
      change the charging start time of the battery on the basis of event information received from the communication part, and
      charge the battery on the basis of the changed charging start time.

2. The electric vehicle according to claim 1, wherein the controller is configured to determine a scheduled departure time of the electric vehicle on the basis of the navigation schedule, and request acknowledgement of the scheduled departure time by controlling the communication part.

3. The electric vehicle according to claim 2, wherein the controller is configured to determine whether the scheduled departure time needs to be changed on the basis of an event information, and change the charging start time on the basis of the changed scheduled departure time.

4. The electric vehicle according to claim 3, wherein the controller is configured to request a user to acknowledge the charging start time by controlling the communication part.

5. The electric vehicle according to claim 1, further comprising:
   a temperature sensor configured to measure a temperature; and
   an air conditioner configured to be operated upon receiving power from the battery.

6. The electric vehicle according to claim 5, wherein the controller is configured to determine whether the air conditioner needs to operate in advance on the basis of at least one of the event information or a detection value of the temperature sensor, and to calculate a power amount of the battery used in the air conditioner.

7. The electric vehicle according to claim 6, wherein the controller is configured to change the charging start time on the basis of the power amount, and to request a user to acknowledge the changed charging start time by controlling the communication part.

8. A system comprising:
a user terminal configured to receive a navigation schedule from a user;
a server configured to receive the navigation schedule received from the user terminal and event information received from an external part; and
an electric vehicle configured to charge a battery using a charger,
wherein the server is configured to:
calculate a charging start time based on a navigation schedule for a departure of the electric vehicle and a residual lifetime of the battery when the battery is connected to the charger,
change the charging start time of the battery on the basis of the event information, and
control an electric vehicle configured to perform battery charging on the basis of the changed charging start time.

9. The system according to claim 8, wherein the server is configured to determine a scheduled departure time of the electric vehicle on the basis of the navigation schedule, and to request the user to acknowledge the scheduled departure time.

10. The system according to claim 9, wherein the server is configured to determine whether the scheduled departure time needs to be changed on the basis of the event information, and to change the charging start time on the basis of the changed scheduled departure time.

11. The system according to claim 10, wherein:
the server is configured to transmit the changed charging start time to the user terminal, and request the user to acknowledge the changed charging start time.

12. The system according to claim 8, wherein:
the electric vehicle further includes an air conditioner configured to be operated upon receiving power from the battery; and
the server is configured to determine whether the air conditioner needs to operate in advance on the basis of the event information, to calculate an amount of additional power used in the air conditioner, and to change the charging start time on the basis of the additional power amount.

13. A charging method for an electric vehicle comprising:
calculating, by a server, a charging start time based on a navigation schedule for a departure of the electric vehicle and a remaining lifetime of a battery when the battery is connected to a charger;
receiving, by the server, event information from an external part;
changing, by the server, the charging start time of the battery on the basis of the event information; and
charging, by the charger, the battery on the basis of the changed charging start time.

14. The method according to claim 13, wherein the changing of the charging start time of the battery includes:
determining whether a scheduled departure time needs to be changed on the basis of the event information; and
changing the charging start time on the basis of the changed scheduled departure time.

15. The method according to claim 14, further comprising:
transmitting the changed charging start time to a user of the electric vehicle, and requesting the user to acknowledge the changed charging start time.

16. The method according to claim 13, wherein the receiving of the event information includes:
receiving a detection value transferred from a temperature sensor of the electric vehicle.

17. The method according to claim 16, wherein the changing of the charging start time of the battery includes:
calculating an amount of power needed to pre-operate an air conditioner of the electric vehicle on the basis of the detection value from the temperature sensor and the event information; and
changing the charging start time on the basis of the calculated power amount.

* * * * *